US012259398B2

(12) United States Patent
Sherrill et al.

(10) Patent No.: US 12,259,398 B2
(45) Date of Patent: Mar. 25, 2025

(54) IMAGE-BASED DECK VERIFICATION

(71) Applicant: Beckman Coulter, Inc., Brea, CA (US)

(72) Inventors: Timothy P. Sherrill, Noblesville, IN (US); Joseph D. Schreiner, Indianapolis, IN (US); Robert P. Miller, Indianapolis, IN (US)

(73) Assignee: Beckman Coulter, Inc., Brea, CA (US)

( * ) Notice: Subject to any disclaimer, the term of this patent is extended or adjusted under 35 U.S.C. 154(b) by 1000 days.

(21) Appl. No.: 16/966,560

(22) PCT Filed: Jan. 31, 2019

(86) PCT No.: PCT/US2019/015980
§ 371 (c)(1),
(2) Date: Jul. 31, 2020

(87) PCT Pub. No.: WO2019/152604
PCT Pub. Date: Aug. 8, 2019

(65) Prior Publication Data
US 2020/0363439 A1 Nov. 19, 2020

Related U.S. Application Data

(60) Provisional application No. 62/625,191, filed on Feb. 1, 2018.

(51) Int. Cl.
G12B 1/00 (2006.01)
B01L 9/00 (2006.01)
(Continued)

(52) U.S. Cl.
CPC ............ G01N 35/0099 (2013.01); B01L 9/54 (2013.01); G01N 35/00712 (2013.01);
(Continued)

(58) Field of Classification Search
CPC ....... G01N 35/00712; G01N 35/00722; G01N 2035/00891; G06T 7/0002; G06T 7/001
See application file for complete search history.

(56) References Cited

U.S. PATENT DOCUMENTS 8,644,547 B2   2/2014   Hodder et al.
8,906,325 B2   12/2014  Oldham et al.
(Continued)

FOREIGN PATENT DOCUMENTS

CN   103592447     2/2014
CN   111886503 A   11/2020
(Continued)

OTHER PUBLICATIONS

"International Application Serial No. PCT/US2019/015980, International Preliminary Report on Patentability mailed Aug. 13, 2020", 10 pgs.
(Continued)

Primary Examiner — Chan S Park
Assistant Examiner — Devin J Dhooge
(74) Attorney, Agent, or Firm — Merchant & Gould P.C.

(57) ABSTRACT

A method for preparing a deck for a process is disclosed. The deck can be prepared with any necessary components, and then an imaging device can capture an image of the deck. This image can be compared with a reference image and any differences identified. The differences can be indicated in the image and shown to an operator, such that the operator can correct any errors associated with the differences.

18 Claims, 7 Drawing Sheets

(51) Int. Cl.
  G01N 35/00 (2006.01)
  G12B 5/00 (2006.01)
  G12B 13/00 (2006.01)
  G06T 7/00 (2017.01)

(52) U.S. Cl.
  CPC .............. *G01N 35/00722* (2013.01); *G01N 2035/00891* (2013.01); *G06T 7/0002* (2013.01); *G06T 7/001* (2013.01)

(56) References Cited

U.S. PATENT DOCUMENTS

| | | | |
|---|---|---|---|
| 9,092,846 B2 * | 7/2015 | Wu | G01N 21/8851 |
| 9,459,273 B2 | 10/2016 | Moix et al. | |
| 2003/0225477 A1 | 12/2003 | Gilman et al. | |
| 2006/0088928 A1 | 4/2006 | Sweet et al. | |
| 2006/0148063 A1 * | 7/2006 | Fauzzi | G01N 1/31 422/65 |
| 2014/0036070 A1 * | 2/2014 | Eckard | G06T 7/74 348/135 |
| 2015/0226759 A1 * | 8/2015 | Connolly | G01N 35/00732 901/41 |
| 2016/0205360 A1 * | 7/2016 | Allen | G02B 21/06 348/745 |
| 2017/0269115 A1 | 9/2017 | Schmidt et al. | |
| 2017/0370956 A1 | 12/2017 | Hurwitz et al. | |
| 2022/0120770 A1 | 4/2022 | Sherrill et al. | |

FOREIGN PATENT DOCUMENTS

| | | |
|---|---|---|
| JP | 2007526479 | 9/2007 |
| JP | 2012047463 | 3/2012 |
| JP | 2013140042 | 7/2013 |
| JP | 2017161517 | 9/2017 |
| JP | 2021512320 | 5/2021 |
| JP | 2022071104 | 5/2022 |
| JP | 2023099809 | 7/2023 |
| JP | 7345483 | 9/2023 |
| JP | 7425816 | 1/2024 |
| WO | 2018096575 | 5/2018 |
| WO | WO-2019152604 A1 | 8/2019 |

OTHER PUBLICATIONS

"Japanese Application Serial No. 2020-541800, Response filed Mar. 2, 2022 to Notification of Reasons for Refusal mailed Dec. 2, 2021", with English claims, 15 pages.
"Japanese Application Serial No. 2020-541800, Notification of Reasons for Refusal mailed Dec. 2, 2021", with English translation, 7 pages.
"International Application Serial No. PCT/US2019/015980, International Search Report mailed Apr. 9, 2019", 4 pgs.
"International Application Serial No. PCT/US2019/015980, Written Opinion mailed Apr. 9, 2019", 8 pgs.
"Japanese Application Serial No. 2020-541800, Final Notification of Reasons for Rejection mailed Jul. 26, 2022", W English Translation, 6 pgs.
"European Application Serial No. 19705656.7, Communication Pursuant to Article 94(3) EPC mailed Sep. 21, 2022", 7 pgs.
"Japanese Application Serial No. 2020-541800, Response filed Oct. 24, 2022 to Final Notification of Reasons for Rejection mailed Jul. 26, 2022", with English claims, 8 pgs.
"Chinese Application Serial No. 201980020736.6, Office Action mailed Feb. 11, 2023", W English Translation, 7 pgs.
"Japanese Application Serial No. 2020-541800, Examiners Decision of Final Refusal mailed Mar. 2, 2023", w English Translation, 6 pgs.
"Japanese Application Serial No. 2022-31691, Notification of Reasons for Refusal mailed Mar. 2, 2023", w English Translation, 8 pgs.
"European Application Serial No. 19705656.7, Response filed Mar. 31, 2023 to Communication Pursuant to Article 94(3) EPC mailed Sep. 21, 2022", 13 pgs.
"Japanese Application Serial No. 2022-31691, Response filed May 24, 2023 to Notification of Reasons for Refusal mailed Mar. 2, 2023", w english claims, 12 pgs.
"Chinese Application Serial No. 201980020736.6, Response filed Jun. 26, 2023 to Office Action mailed Feb. 11, 2023", with machine translation, 16 pgs.
"Japanese Application Serial No. 2022-31691, Decision of Rejection mailed Aug. 31, 2023", w English Translation, 5 pgs.
"Chinese Application Serial No. 201980020736.6, Office Action mailed Sep. 28, 2023", W English Translation, 6 pgs.
"Japanese Application Serial No. 2022-31691, Response filed Nov. 10, 2023 to Decision of Rejection mailed Aug. 31, 2023", w english claims, 14 pgs.
"Chinese Application Serial No. 201980020736.6, Response filed Dec. 13, 2023 to Office Action mailed Sep. 28, 2023", 12 pgs.
"U.S. Appl. No. 17/567,647, Non Final Office Action mailed Apr. 9, 2024", 16 pgs.
"Chinese Application Serial No. 201980020736.6, Office Action mailed Feb. 22, 2024", with machine translation, 12 pgs.
"Chinese Application Serial No. 201980020736.6, Request for Reexamination filed May 22, 2024", 15 pgs.
"Japanese Application Serial No. 2020-541800, Appeal of an Adverse Decision filed May 26, 2023", with English claims, 15 pgs.
European Patent Office Office Action for Application No. 19705656. 7, mailed Sep. 17, 2024, 7 pages.

* cited by examiner

FIG. 6A

IMAGE-BASED DECK VERIFICATION

CROSS-REFERENCES TO RELATED APPLICATIONS

This application is a U.S. National Stage Filing under 35 U.S.C. 371 from International Application No. PCT/US2019/015980, filed on Jan. 31, 2019, and published as WO 2019/152604 on Aug. 8, 2019, which application claims priority to U.S. Provisional Patent Application No. 62/625,191, filed Feb. 1, 2018, the contents of which are incorporated by reference in their entirety for all purposes.

BACKGROUND

Sample processing systems can be used to analyze biological samples. Once a sample processing system is programmed and the necessary materials are laid out in a specific way, the system can automatically execute analyses or other processing for the samples. For example, biological samples in test tubes can be assembled and staged in a specified position on a deck. Also, pipette tips can be assembled and staged in another position on the deck and test containers such as microwell plates may be positioned at yet another position on the deck. Then, when an analysis process has started, a robotic arm can retrieve one or more pipette tips and use the tips to transfer a portion of the samples from some of the test tubes as needed and transport them to the test containers for further processing.

While these automated systems can efficiently analyze biological samples when properly set up, they rely on human operators to properly prepare the system before the analysis process is started. If a human operator places an array of test tubes in the wrong area, or forgets to prepare the test tubes, the system may not be able to complete the analysis process and/or it may cause the system to malfunction. Such human errors are common, especially for systems that are frequently reconfigured for running different experiments, as well as for processes that involve multiple types of components that need to be placed in particular locations. Accordingly, human preparation errors frequently cause automated biological sample analysis processes to fail.

Some techniques have been used to address this human error problem. For example, grid-like illustrations and virtual representations are used to show the operator where different components should be placed in a staging area. However, even with such tools, operators continue to make mistakes, as they have trouble relating illustrations to the real-world environment. For example, the operator may place components in a similar pattern, but with each component accidentally shifted to the side by one location. Additionally, scanners have been introduced that move from station to station, checking for the type of component placed in each station to ensure that each required component has been prepared and placed in its proper location. However, the scanning process can take too much time to efficiently check the entire staging area. Accordingly, there is still a need for an improved method of preparing components and a deck staging area.

Further, alternative versions of some components may be acceptable for some techniques. A fully automated scanning or recognition system for components may identify the acceptable alternative components as different from the requirements of a protocol. This may cause the system to needlessly abort a protocol that could have been run successfully. There is thus a place for human judgment in an improved method for preparing or verifying components within a deck staging area.

Embodiments of the invention address these and other challenges, individually and collectively.

BRIEF SUMMARY

Some embodiments of the invention incorporate an imaging device into a processing system. The imaging device captures an image of a deck or other staging area. When an experiment or other process is initially configured, the imaging device can capture an image of the correctly prepared deck. At a later time, when the operator is preparing the deck for another execution of the process, the imaging device can capture another image. The second image can be compared with the first image to identify any differences between the images. The differences can be indicative of human errors in preparing the deck, such as a package of components being placed in the wrong area. The real-world image of the deck can be modified to highlight the differences to the operator, and the operator can proceed to inspect the highlighted locations on the deck and make any necessary corrections. The real-world image highlighting the differences is easier for the operator to understand, and as a result, the operator can have a high likelihood of successfully correcting the errors.

One embodiment of the invention is directed to a method comprising causing an imaging device to capture a second image of a deck of a structure. The deck comprises a plurality of discrete deck locations with a plurality of different components respectively in the discrete deck locations. The method also includes comparing the second image to a first image stored in a memory in a computer apparatus, determining if there are any differences between the second image and the first image, and outputting an indication of any differences between the second image and the first image that may cause disruption or failure of a process run on an apparatus.

Another embodiment of the invention is directed to a system configured to perform the above-described method.

These and other embodiments of the invention are described in further detail below, with reference to the drawings.

BRIEF DESCRIPTION OF THE DRAWINGS

FIGS. 6A-6B show an example of different deck verification views that can be available to the operator, according to an embodiment of the invention

DETAILED DESCRIPTION

Embodiments of the invention can be used to prepare a deck or staging area for an analysis or other process. For example, after a human operator places different components in different places on the deck, an imaging device can capture an image of the prepared deck. This image can be compared with another image that shows a correct setup of the deck. The differences between the current image and the previous image can be highlighted and shown to the operator. The operator can then inspect, in the real-world, areas that correspond to the highlighted areas of the image and make any necessary corrections (e.g., swapping an incorrect component for a correct component).

The image can be captured and analyzed quickly, facilitating a fast correction process. Additionally, the operator can understand a real-world image better than a deck illustration, and thus can correct any errors quickly and effectively.

Prior to discussing specific embodiments of the invention, some terms may be described in detail.

A "component" may include a part, a piece, or an element. Components can include tools and constituent elements used to complete a procedure, such as biological experiment or a manufacturing process. Examples of components include supplies used in biological experiments, such as sample tubes, pipette tips, biological samples, reagents, chemicals, microwell plates, and any other suitable material or labware. Components can sometimes be grouped together in a tray or other suitable package. In some embodiments, a certain type of component can be typically found in a uniquely configured package, or in a package with a specific label.

Figure 1:
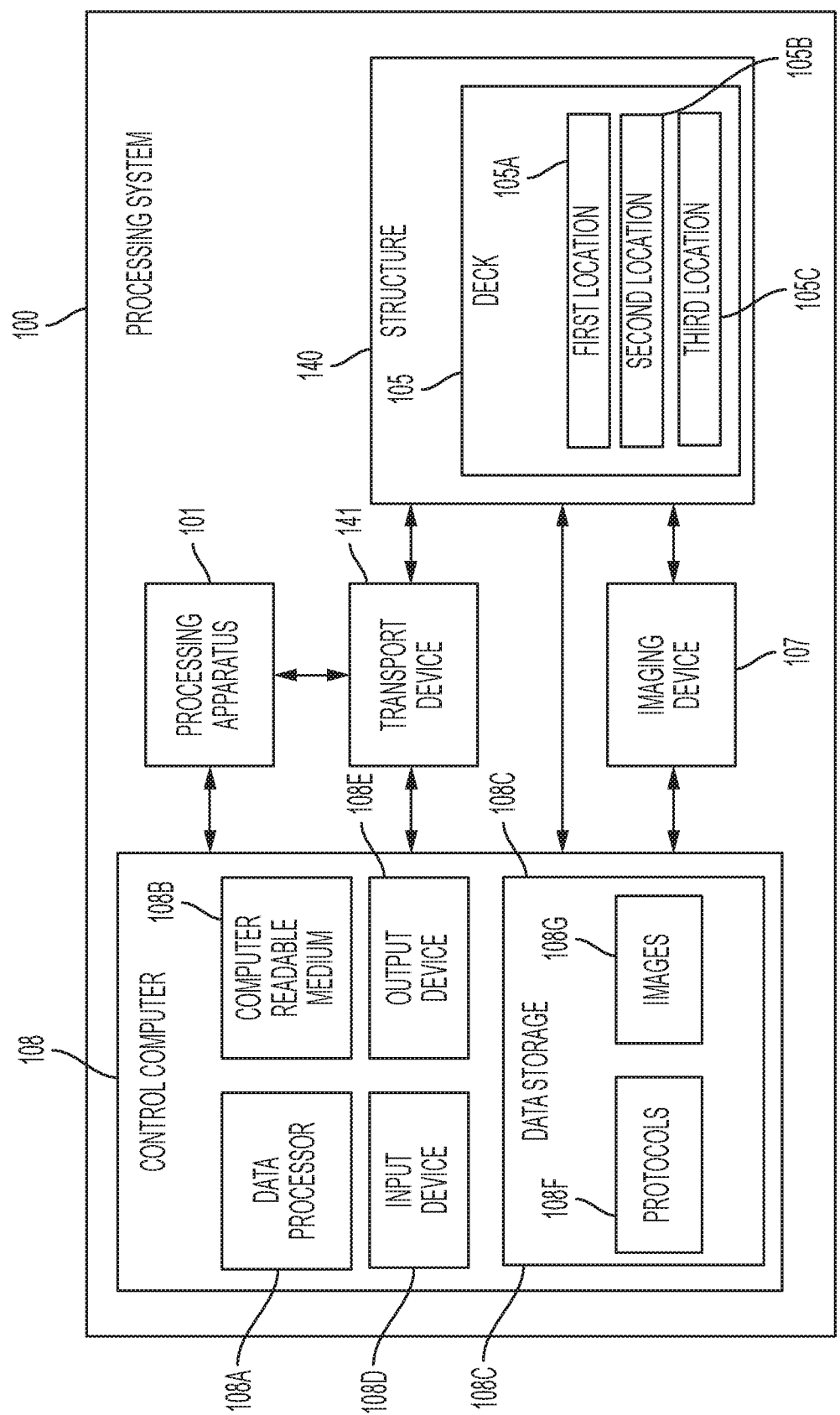
FIG. 1 shows a block diagram of a processing system according to an embodiment of the invention.

FIG. 1 shows a high-level block diagram of a processing system 100 according to an embodiment of the invention. The processing system 100 comprises a control computer 108 operatively coupled to a structure 140, a transport device 141, a processing apparatus 101, and an imaging device 107. Input/output interfaces may be present in each of these devices to allow for data transmission between the illustrated devices and any external devices. An exemplary processing system is the Biomek i7 Automated Workstation marketed by the Beckman Coulter, Inc. of Brea, California.

Embodiments of the invention can include imaging a deck in order to determine whether or not the components have been correctly arranged on the deck. For explanatory purposes, the processing system 100 will mainly be described as a sample processing system for processing and analyzing biological samples. However, embodiments can apply to any other suitable type of process that involves a deck with pre-loaded components.

The structure 140 may include support legs, a power source, a deck 105, and any other suitable feature. The deck 105 can include a physical surface (e.g., a planar physical surface) upon which components can be placed and accessed for experiments, analyses, and processes. In some instances, the deck 105 may be a floor or a tabletop surface. The deck 105 can be subdivided into a plurality of discrete deck locations for placing different components. The locations can be directly adjacent, or may be spaced apart. Each deck location can include dividers, inserts, and/or any other support structure for separating the different deck locations and containing components. For exemplary purposes, FIG. 1 shows a first location 105A, a second location 105B, and a third location 105C on the deck, though additional locations can be included.

The transport device 141 (which can represent multiple transport devices) can prepare and/or transport components between the deck 105 and the processing apparatus 101, as well as between different locations on the deck 105. Examples of transport devices may include conveyors, sample tracks, pick and place grippers, laboratory transport elements that can move independently (e.g., pucks), robotic arms, and other tube or component conveying mechanisms. In some embodiments, the transport device 141 includes a pipetting head configured to transfer liquids. Such a pipetting head may transfer liquids within removable pipette tips and may include grippers suitable for grasping or releasing other labware, such as microwell plates.

The processing apparatus 101 can include any number of machines or instruments for executing any suitable process. For example, the processing apparatus 101 can include an analyzer, which may include any suitable instrument that is capable of analyzing a sample such as a biological sample. Examples of analyzers include spectrophotometers, luminometers, mass spectrometers, immunoanalyzers, hematology analyzers, microbiology analyzers, and/or molecular biology analyzers. In some embodiments, the processing apparatus 101 may include a sample staging apparatus. A sample staging apparatus can include a sample presentment unit for receiving sample tubes with biological samples, a sample storage unit for temporarily storing sample tubes or sample retention vessels, a means (or device) for aliquotting a sample (such as an aliquottor), a means for holding at least one reagent pack comprising the reagents needed for an analyzer, and any other suitable features.

The imaging device 107 can be any suitable device for capturing an image of the deck 105 and any components on the deck 105 (or the entire structure 140). For example, an imaging device 107 can be any suitable type of camera, such as a photo camera, a video camera, a three dimensional image camera, an infrared camera, etc. Some embodiments can also include three dimensional laser scanners, infrared light depth-sensing technology, or other tools for creating a three dimensional surface map of objects and/or a room.

The control computer 108 can control the processes run on the processing system 100, initially configure the processes, and check whether a component setup has been correctly prepared for a process. The control computer 108 can control and/or transmit messages to the processing apparatus 101, the transport device 141, and/or the imaging device 107. The control computer 108 may comprise a data processor 108A, a non-transitory computer readable medium 108B and a data storage 108C coupled to the data processor 108A, one or more input devices 108D, and one or more output devices 108E.

Although the control computer 108 is depicted as a single entity in FIG. 1, it is understood that the control computer 108 may be present in a distributed system or in a cloud-based environment. Additionally, embodiments allow some or all of the control computer 108, the processing apparatus 101, the transport device 141, and/or the imaging device 107 to be combined as constituent parts in a single device.

The output device 108E may comprise any suitable devices that may output data. Examples of an output device 108E may include display screens, speakers, and data transmission devices.

The input device 108D may include any suitable device capable of inputting data into the control computer 108. Examples of input devices include buttons (e.g., a keyboard and mouse), touchscreens, touch pads, microphones, etc.

The data processor 108A may include any suitable data computation device or combination of such devices. An exemplary data processor may comprise one or more microprocessors working together to accomplish a desired function. The data processor 108A may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The computer readable medium 108B and the data storage 108C may be any suitable device or devices that can store electronic data. Examples of memories may comprise one or more memory chips, disk drives, etc. Such memories may operate using any suitable electrical, optical, and/or magnetic mode of operation.

The computer readable medium 108B may comprise code, executable by the data processor 108A to perform any suitable method. For example, the computer readable medium 108B may comprise code, executable by the processor 108A, to cause the processing system 100 to perform a method including causing an imaging device to capture a second image of a deck of a structure, the deck comprising a plurality of discrete deck locations, a plurality of different components respectively in the discrete deck locations; comparing, the second image to a first image stored in a memory in a computer apparatus; determining if there are any differences between the second image and the first image; and outputting an indication of any differences between the second image and the first image that may cause disruption or failure of a process run on an apparatus.

The computer readable medium 108B may comprise code, executable by the data processor 108A, to receive and store process steps for one or more protocols (e.g., a protocol for analyzing a biological sample), as well as to control the structure 140, the transport device 141, and/or the processing apparatus 101 to execute the process steps for the one or more protocols. The computer readable medium 108B can also include code, executable by the data processor 108A, for receiving results from the processing apparatus 101 (e.g., results from analyzing a biological sample) and for forwarding the results or using the results for additional analysis (e.g., diagnosing a patient). Additionally, the computer readable medium 108B may comprise code, executable by the data processor 108A, for comparing two images of a deck, identifying differences between the two images, and displaying the images with indicated differences to a user.

The data storage component 108C may be internal or external to the control computer 108. The data storage component 108C may include one or more memories including one or more memory chips, disk drives, etc. The data storage component 108C may also include a conventional, fault tolerant, relational, scalable, secure database such as those commercially available from Oracle™ or Sybase™. In some embodiments, the data storage 108C may store protocols 108F and images 108G.

The protocols 108F in the data storage component 108C may include information about one or more protocols. A protocol can include information about one or more processing steps to complete, components used during the process, a component location layout, and/or any other suitable information for completing a process. For example, a protocol can include one or more ordered steps for analyzing a biological sample. A protocol can also include steps for preparing a list of components before starting the process. The components can be mapped to specific locations on the deck 105 where the transport device 141 can obtain the components in order to transport them to the processing apparatus 101. This mapping can be encoded as instructions for operating the transport device 141, and the mapping can also be represented by a virtual image shown to a user such that the user can place the components on the deck 105. Embodiments allow the processing system 100 to be used for multiple processes (e.g., multiple different biological analyses). Accordingly, information about multiple protocols 108F can be stored and retrieved when needed. Components on the deck 105 can be rearranged, changed, and/or replenished as necessary when changing from a first process to a second process, or when re-starting a first process.

An image can include a depiction of one or more objects. As examples, images can include digital pictures or photographs, videos, three-dimensional pictures and videos, color photos, black and white photos, high dynamic range images (e.g., combining multiple images taken of the same subject with different exposures), etc. The images 108G in the data storage 108C may include a real-world visual representation of the deck 105. In each image, the deck 105 can be shown in a ready state for beginning a certain process, with all necessary components placed in their proper locations. Each of the images 108G can be associated with a specific protocol from the stored protocols 108F. In some embodiments, there may be a single image for certain protocol. In other embodiments, there can be multiple images (e.g., from different angles, with different lighting levels, or containing acceptable labware substitutions in some locations) for a certain protocol. The images 108G can be stored as various types or formats of image files including JPEG, TIFF, GIF, BMP, PNG, and/or RAW image files, as well as AVI, WMV, MOV, MP4, and/or FLV video files.

Figure 2:
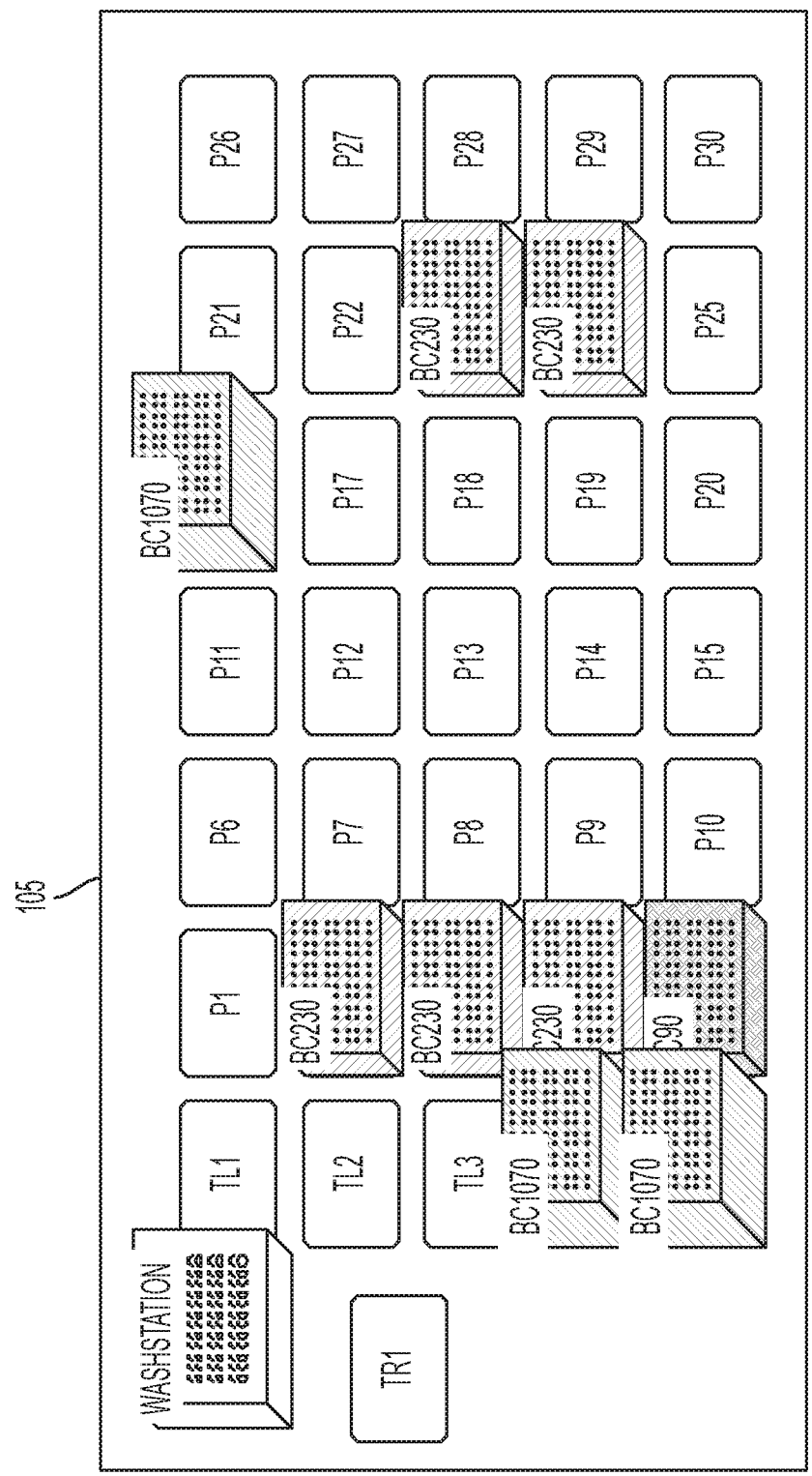
FIG. 2 shows a diagram of a deck according to embodiment of the invention.

As mentioned above, the deck 105 can be subdivided into a plurality of discrete deck locations for staging different components. The discrete locations may be of any suitable size. An example of a deck 105 with a plurality of locations is shown in FIG. 2. The deck 105 in FIG. 2 shows separate areas numbered P1 through P30, as well as TL1 through TL5, TR1, and a wash station, each of which can operate as separate locations for separate types of components or packages of components. Some of the separate area numbers in FIG. 2 are obscured by overlying components: these locations may be identified by numbers sequential to those associated with visibly numbered separate areas. Embodiments allow the deck 105 to have additional locations or fewer locations as desired. While these locations can be numbered or named, they may or may not be physically labeled or marked on the deck 105 in the real world.

Embodiments allow some or all of the locations to be occupied by a pre-defined type of component according to a certain protocol. As an example, FIG. 2 shows locations P2, P3, P4, P5, P16, P23, P24, TL4, and TL5 each being loaded with packages of components as specified by a first protocol. Some of the locations can include the same type of component. For example, locations P2, P3, and P4 all include the component type labeled BC230, which can represent a certain type of test tube, microwell plate, pipette tips, or any other suitable labware component.

In some embodiments, one or more locations may not be physically a part of the structure 140 or deck 105, but may instead be on the floor or another surface adjacent to the structure 140 and/or the deck 105. These locations may be included because they can still be accessed by the transport device 141. For example, locations TL1 through TL5, TR1, and/or the wash station may be physically separate from the structure 140 and/or the deck 105.

Figure 3:
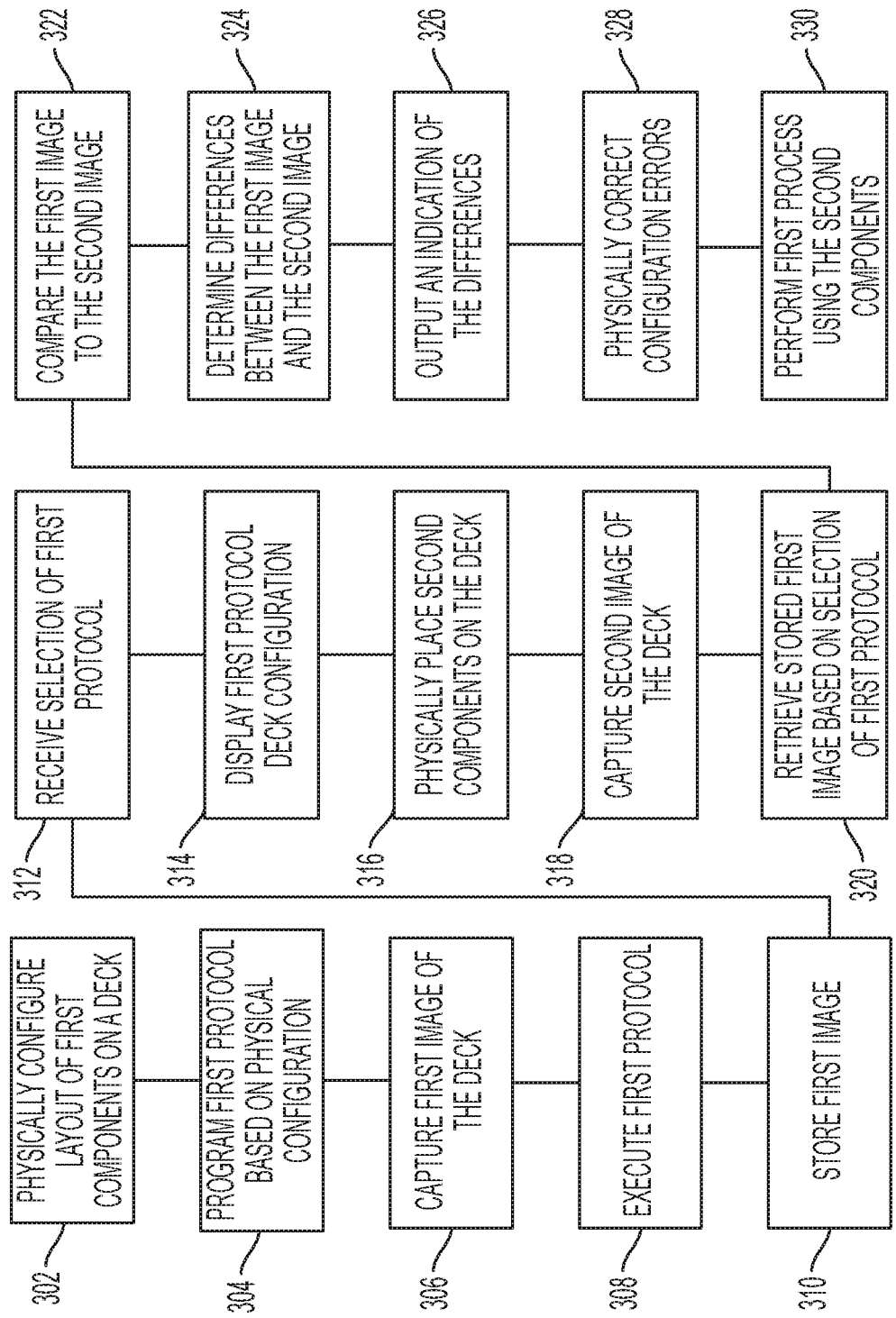
FIG. 3 shows a flowchart illustrating a deck verification process according to embodiments of the invention.

FIG. 3 shows a high level flowchart illustrating a deck verification process according to embodiments of the invention.

At step 302, during configuration of a new protocol (e.g., referred to as the first protocol), an operator can physically configure the layout of a first set of components on the deck. For example, the operator can determine where to place a first type of components (e.g., labware such as pipette tips) in one or more first locations, where to place a second type of components (e.g., labware such as sample tubes) in one or more second locations, and so forth. For example, the processing apparatus and deck can be used for executing multiple processes, and the processing apparatus, transport device, and/or control computer can be programmed to allow a user to configure types of components that are to be located in a plurality of discrete deck locations so that different processes can be run on the apparatus.

At step 304, the operator can program the first protocol based on the established location configuration of the components. For example, the control computer (and/or processing apparatus) can receive, from the operator, information about the specific locations in which different type of components will be placed for use during a first process. This can be done using a menu that allows a user to drag and drop representations of components into specific locations. The operator can also program the steps of the first process (e.g., the steps needed to perform a certain type of biological sample analysis), and the manner in which the components are to be used during the first process. Embodiments allow this step of protocol programming to take place either before or after the first image is captured at step 306.

At step 306, the control computer can cause the imaging device (e.g., a camera) to capture a first image of the deck of the structure. The image can be taken from a static camera position and used for later reference. The image may be captured at a moment in time when the deck has been fully loaded with the components, and when the first process performed in step 308 has not yet begun (e.g., such that the components have not yet been used, moved, or otherwise disturbed). Thus, the image can capture a plurality of discrete deck locations as well as a first plurality of different components respectively in the discrete deck locations.

At step 308, the control computer can execute the first process as defined by the first protocol. For example, the transport device can transport the components from the deck to one or more instruments of the processing apparatus according to the first process, and the processing apparatus can manipulate the components to perform the first process, as well as communicate any results back to the control computer. For example, the processing apparatus can be an analyzer, and the first process can include analyses of biological samples. Step 308 can take place after step 306, such that the image reflects the deck configuration as it appears before the process begins.

At step 310, the control computer can store (e.g., in the data storage or other memory) the first image of the deck. The first image can be stored as associated with the first protocol and used as a reference image for future executions of the first process. In some embodiments, the operator and/or control computer can determine to store the first image after step 308 if the first process is successfully completed. If the first process is not successfully completed, the first image used with the unsuccessful first process can be discarded, the component layout on the deck can be reconfigured and/or the first process adjusted, and another first image can be captured. Once the first process has been successfully completed, the first protocol can be saved in the data storage memory along with a captured first image corresponding to the successful first protocol.

At step 312, at a later time, the control computer can receive a selection of the first protocol. For example, the output device can provide a selection window for the operator to select among various protocols, and the operator may select (e.g., via the input device) the first protocol in order to run the first process. This step can take place after a different process has been run on the processing system.

At step 314, the control computer can, via the output device, display a first protocol deck configuration as specified by the selected first protocol. The display can include a virtual representation of the deck, the different deck locations, and the components to be placed at each location. For example, the display can be similar to FIG. 2. In some embodiments, the control computer can also display the stored image along with any other suitable type of information for instructing the operator how to prepare the system.

At step 316, the operator or a machine under the operator's control can physically place a second set of components on the deck. The operator can use the protocol instructions and displayed component diagram as a guide for placing specific types of components in specific locations. If the operator correctly places the components, each of the locations will have the same type of component as previously staged during the initial configuration of the protocol (e.g., in step 302).

At step 318, the control computer can cause the imaging device to capture a second image of the deck of the structure. In some embodiments, the second image of the deck is captured after the operator is finished placing the second set of components, and before the process is executed. Thus, the second image can capture the plurality of discrete deck locations as well as a second plurality of different components respectively in the discrete deck locations. The second image can be taken with the same camera, from the same position and angle, and/or otherwise taken in the same manner as the first image. As a result, the second image and first image can be compared to identify differences. In some cases, multiple images from different angles or perspectives can be taken.

At step 320, the control computer can retrieve the stored first image from the data storage (or other memory) based on the selection of the first protocol.

At step 322, the control computer can compare the first image to the second image in order to identify any relevant differences. For example, the control computer can identify, for each location on the deck, whether components shown in the second image are different than components shown in the first image. In some embodiments, the control computer can analyze the pixels or objects in each image to identify difference in colors, shapes, component labels, or any other suitable indicators. These differences may be indicative of incorrect components in the second image. In some embodiments, the control computer can determine, based on the image characteristics (e.g., colors, shapes, etc.), the actual types of components in each image and determine whether the components are the same or different. Additional details regarding the image comparison are discussed below with respect to FIG. 5.

At step 324, the control computer can, based on the image comparison, determine if there are any differences (e.g., one or more differences) between the first image and the second image. Additionally, the control computer can determine whether any locations are not visible in the images (e.g., due to the camera position and angle).

In some embodiments, whether or not a difference exists between images can be based upon a threshold of similarity. For example, if portions of two images are 98% similar, then this may be sufficient for the control computer to conclude that there is no meaningful difference.

At step 326, the control computer can display or otherwise output (e.g., via the output device) an indication of any determined differences to the operator. Such differences could cause disruption or failure of the process if the process apparatus is allowed to run without correction. The output can include the first image and/or the second image, as well as difference indicators on the images. For example, components and locations in question can be highlighted, circled, or otherwise identified for the operator. Indicators can show the operator, for example, a deck location that has different components in the second image and first image. The output might also include the virtual representation from step 314.

If no differences were found, the method can continue to step 330 where the process is performed. For example, the output can indicate that there are no differences between the second image and the first image that may cause disruption or failure of the process run on the apparatus, and then the operator can initiate execution of the first process.

At step 328, the operator can physically correct one or more component configuration errors based on the displayed differences. Displaying the first and or second image to the user with highlighted differences can facilitate a better operator response, as real-world images can be easier for a person to understand than a virtual representation. The differences in the images may not all require correction. For example, the correct type of component may have been used, but it may be flagged because it had a different color (which may not affect the process). Accordingly, the operator may make one or more corrections (e.g., swapping certain components in certain locations), but may not change the components at every location with a difference indicated in the images.

At step 330, the processing system can perform the first process using the second components placed on the deck. The process may be completed successfully as the image comparison may have enabled the operator to identify and correct any preparation errors.

Embodiments allow the deck setup to be verified before each subsequent run of the first process and/or alternative processes. For example, steps 312-330 can be repeated each time the first process is being executed.

Figure 4:
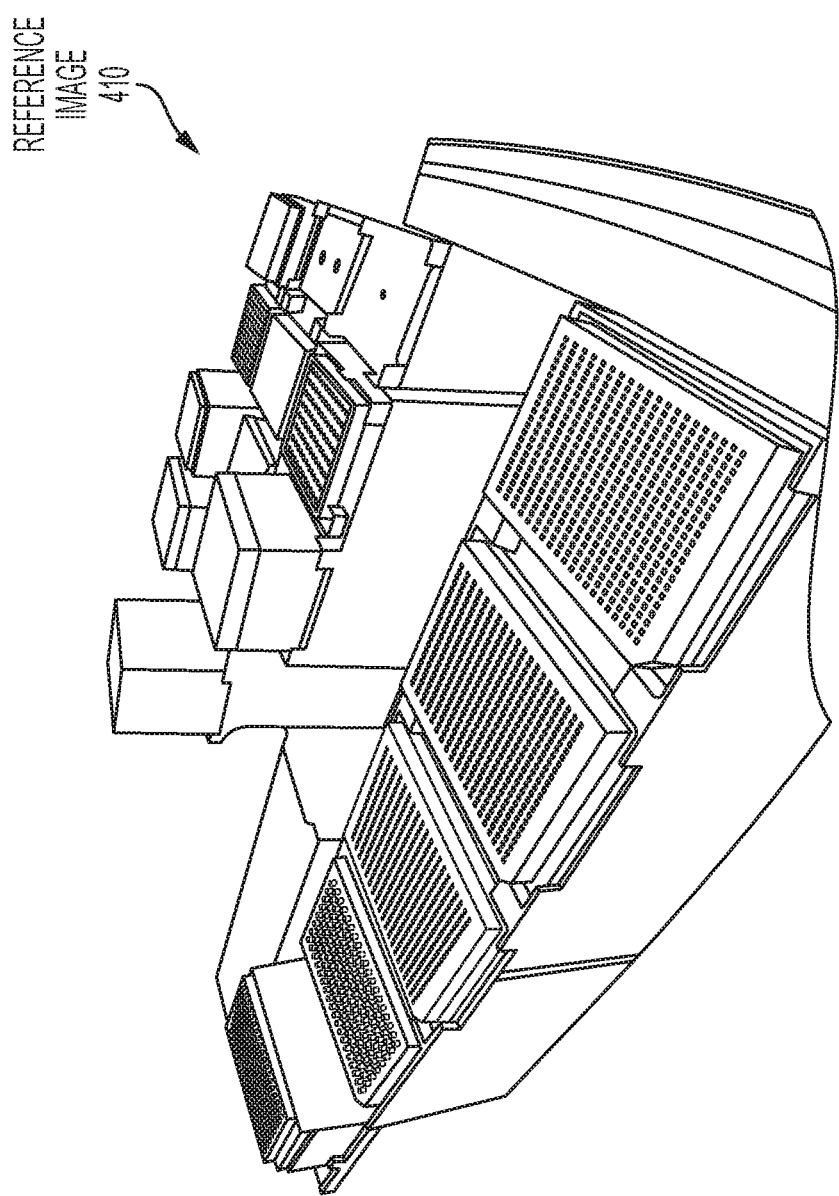
FIG. 4 shows an example reference image of a deck according to an embodiment of the invention.

As described with respect to step 306, the imaging device can capture and store the first image of the deck to be used as a reference for comparing with a later image. An example of such a reference image 410 is shown in FIG. 4, according to an embodiment of the invention. The reference image 410 can be taken from any suitable perspective, such as a perspective that optimizes the view of the components, or from a position where the imaging device is least likely to be disturbed. The reference image 410 can include some or all deck locations (e.g., depending on the camera angle, position, and field of view). It is possible that some locations can be shielded from view by components or other obstructions. In some embodiments, multiple reference images can be taken from multiple perspectives in order to show all the locations and components. Additionally, multiple images can be combined together to create one larger image with more inclusive perspective.

The components shown in the reference image 410 can be distinguished based on the size, shape, color (e.g., a pipette tip rack color), well density, number of stacked plates (e.g., one location can include three stacked trays of pipette tips), and/or any other suitable physical feature of the component or the component's container. Additionally, the component containers may include labels, barcodes, or other identifiable features.

Because the reference image 410 can be a real-world image, the reference image 410 can include objects other than the components and deck. For example, the background of the image can include other lab equipment, walkways, shadows, and personnel, etc. that may be present in the image. In some embodiments, such additional information can be shaded or otherwise ignored by the control computer during the comparison process. This can prevent the control computer from finding and displaying irrelevant differences in the background when comparing the reference image 410 with a subsequent image.

Figure 5:
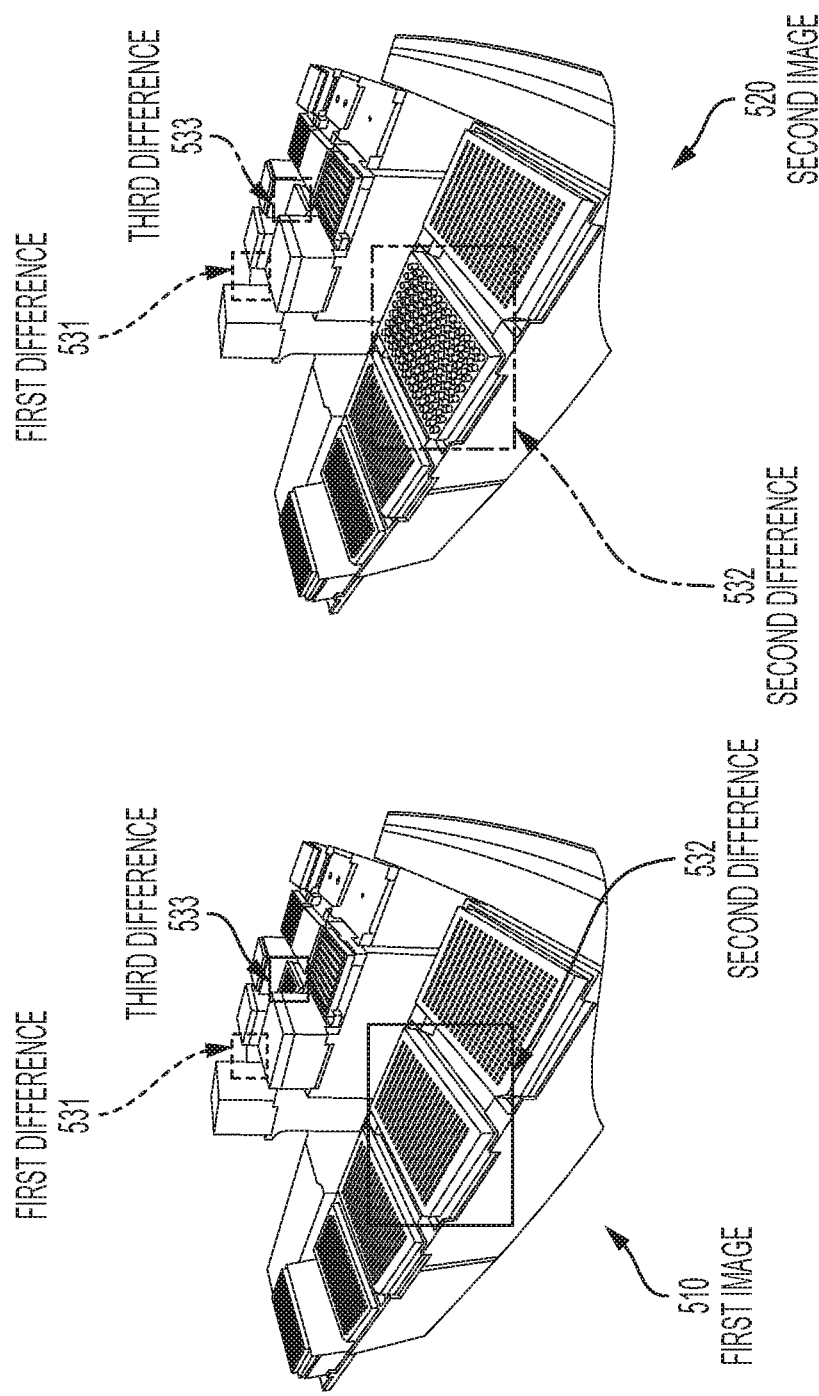
FIG. 5 shows an example of a comparison between a reference image and a new image according to an embodiment of the invention.

FIG. 5 shows an example of a comparison between a first image 510 (e.g., a reference image) and a second image 520 (e.g., a new image) according to an embodiment of the invention. The display shown to a user (e.g., as described above with respect to step 326) can include one or both of these images.

As shown in FIG. 5, one or more locations can be indicated in the first image 510 and/or second image 520. The locations can be indicated because they include different content in the first image 510 and second image 520. For example, a first difference 531 between the first image 510 and second image 520 can be indicated because that deck location does not have the same appearance in the two images. Similarly, a second difference 532, a third difference 533, and any other suitable number of differences can be indicated.

In FIG. 5, the differences are indicated by superimposing a rectangular frame over the deck location. Embodiments allow alternative indications to be used, such as highlights, arrows, coloring, increased brightness, listing of the locations, and/or any other suitable indication. In some embodiments, the second image 520 can be made partially transparent and then superimposed over the first image 510, such that non-matching parts of the images do not blend together and thus become visibly evident to a viewer. Further, when the first image 510 and the second image 520 are shown in the same space in this manner, a slider tool may be used to adjust how intensely either image is shown. For example, sliding to the left can cause the first image 510 to be shown more vividly and the second image 520 to be more transparent, while sliding to the right can cause the second image 520 to be shown more vividly and the first image 510 to be more transparent.

In some embodiments, some or all of the indicated differences can be indicative or problems with the deck setup (e.g., incorrect components placed in those locations, not enough of a component a location, no component in a location where there should be one, incorrect type of component at the location, etc.), and the problems can cause disruption or failure of the process if the deck setup is not corrected. Embodiments also allow the control computer to identify image differences without determining whether or not the differences would cause a problem. For example, the differences can represent a possible problem which the operator is advised to inspect (e.g., a component package has a different color, which may or may not be indicative of the wrong type of component). Additionally, concerns other than differences can be identified, such as deck locations that are not visible in the image.

The control computer can also concurrently output a virtual representation of the protocol's deck configuration, such as the display shown in FIG. 2. This can provide the operator with an additional perspective, and can assist the operator with identifying the type of component assigned to an indicated location. The control computer can additionally provide a list of details related to the possible errors, the list describing the location of the possible error, as well as information about what led to the diagnosis of the possible error (e.g., an unexpected color or shape)

In some embodiments, the control computer may only compare portions of the images that include the deck and/or components, and the control computer may disregard other portions of the image (e.g., the background, walkway perimeters, etc.). Additionally, irrelevant portions first image 510 and/or second image 520 can be erased, blacked out, shaded, masked, or otherwise obscured such that the operator's attention is not diverted from the relevant portions (e.g., the deck and components). This is shown in the figures, as the non-essential perimeter areas of the images in FIG. 5 are darkened as compared to the original reference image shown in FIG. 4.

When determining the differences between the first image 510 and the second image 520, the control computer can use any suitable image comparison technique, as well as any suitable image comparison software. In one example, the control computer can compare the color value assigned to each pixel in both images, and identify values that differ. A difference in the images may be triggered by a single pixel differing, or by a group (e.g., 10, 20, or 100) of adjacent pixels all differing.

In some embodiments, instead of comparing small groups of pixels, the control computer can identify each deck location and/or component package in the images (e.g., based on a component package perimeter outline), and can determine whether the location or component package is shown differently between the two images. Identifiable differences can include package color, package shape, component label or barcode, well density, number of stacked plates, well shapes, whether labware is lidded, or any other visually identifiable difference. Some differences, such as color, can be indicative of an incorrect component, or may be the result of the same component having a different package color. Either way, the difference can be pointed out to the operator such that the operator can determine whether correction is needed.

In some embodiments, the control computer can map a certain range of pixels to a deck location. For example, the control computer can map one of the discrete deck locations to a pixel range in the first image or the second image. Thus, the control computer can determine which location (e.g., location P14) is associated with a difference identified in the second image 520. This allows the control computer to label the differences with the location number to assist the operator with identifying the location in question.

The control computer may be able to analyze an image and determine what type of component is shown in each location. As a result, the control computer can identify if a location includes, for example, test tubes in the first image 510, but that same location includes pipette tips in the second image 520.

As an example, the first difference 531 can represent a deck location that is not visible in either image, the second difference 532 can represent a component package that has a different color or different component type in the second image 520, and the third difference 533 can represent a deck location that is incorrectly empty in the second image 520.

In some embodiments, certain differences in component appearance can be disregarded. For example, if not desired to be identified, the control computer may not report differences in liquid color (e.g., liquid in a well, tube, or reservoir), as liquid color can change from process run to process run. Similarly, differences in the amount of a liquid can be ignored, differences in hand-written information can be ignored, and any other suitable variations that may not cause any process issues can be ignored.

In some embodiments, the control computer may be able to discard the first image 510 and use the second image 520 as the new reference, for example if instructed by the operator. Alternatively, the operator may choose to add the second image 520 as another reference of an acceptable deck in addition to the first image 510 (e.g., instead of discarding the first image 510). Additionally, the operator may be able to instruct the control computer to accept the current setup and proceed with the process without making any changes to the deck.

Figure 6A:
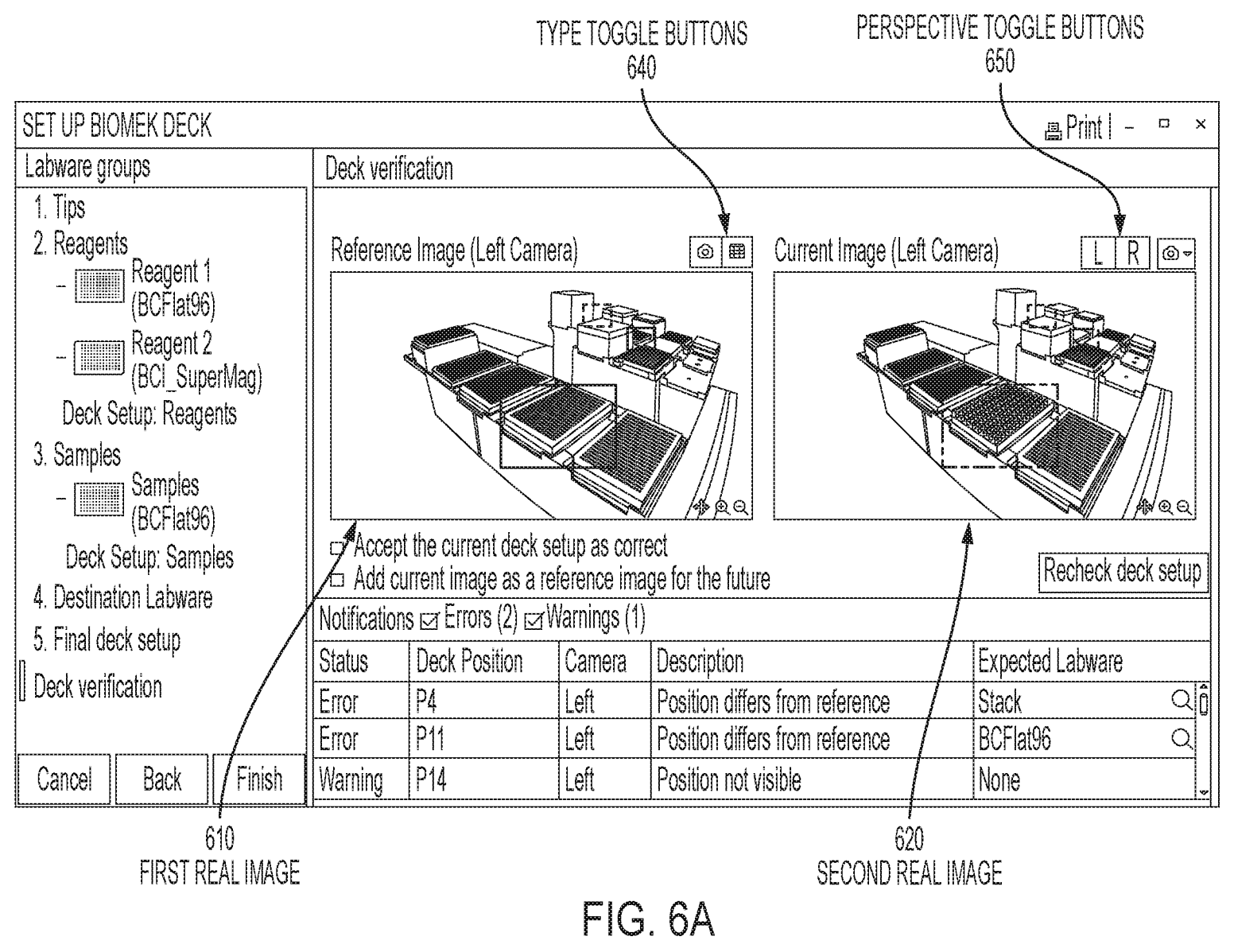
Figure 6B:
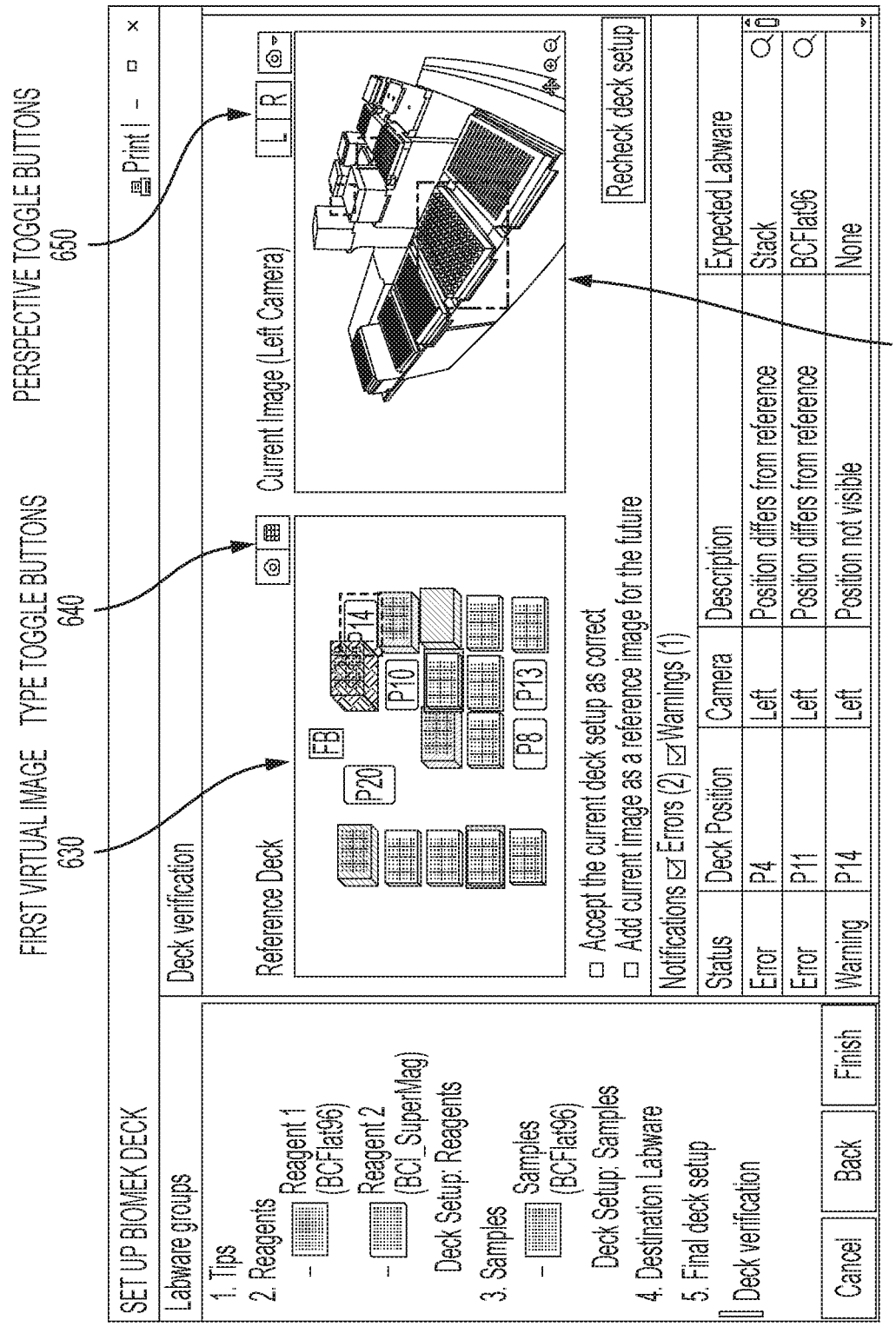

FIGS. 6A-6B show an example of different deck verification views that can be available to the operator, according to an embodiment of the invention. The control computer can output multiple displays that show image differences and/or deck setup errors to the operator in different manners. The operator may be able to toggle between these different displays.

FIG. 6A shows a first display which can include a first real image 610 and a second real image 620. Similar to FIG. 5, the first real image 610 can be a real image (e.g., taken with a camera) of a deck taken during the initial configuration of a process. The second real image 620 can be another real image (e.g., taken with a camera) of a deck taken when preparing the deck at a later time for a subsequent execution of the process.

FIG. 6B shows a second display which replaces the first real image 610 with a first virtual image 630. The first virtual image can include a non-real graphic depiction of the deck that demonstrates which types of components are assigned to each location. For example, the first real image 610 can be a virtual representation of an overhead view of the deck. Embodiments allow the first virtual image 630 to include indications (e.g., highlights) of the deck locations which might include errors (e.g., based on image differences).

As a result, the operator can switch between viewing a real image of a correct deck configuration (e.g., the first real image 610) and a virtual representation of a correct deck configuration (e.g., first virtual image 630). While the operator can toggle between these options (e.g., using the type toggle buttons 640), the output device can continually display a real image of the current deck setup (e.g., the second real image 620). These different images can provide the operator with multiple perspectives and depictions of the deck, as well as multiple comparisons between a correct deck setup and the current deck setup, such that the operator can better understand how the deck should look and exactly which deck locations might need to be corrected.

Embodiments additionally allow the operator to manipulate the display in other manners. For example, the operator can switch between different real images captured by different imaging devices having different perspectives of the deck. This is shown by the perspective toggle buttons 650 which can switch between images from a left camera and a right camera. As another example, the operator may be able to zoom in and out onto a certain image, as well as reset to a full camera view.

In addition to toggling a first display area between the first real image 610 and the first virtual image 630, the output may be configured to switch a second display area between the second real image 620 and the first real image 610. As a result, the operator may be able to switch, in the same space, between the current deck setup and the correct deck setup. When toggling in this manner, the correctly-configured areas can appear the same, and the incorrectly prepared locations can change. The display areas that change in time when switching between the images can be apparent to the viewer.

Additionally, in some embodiments, when the user selects or moves a mouse pointer over a highlighted deck location (or a listed notification), the output device can display additional information concerning that location, such as the expected type of component for that location. Further, the display can include a list of notifications (e.g., image differences or errors), and if the operator selects an entry in the notification list, the images can be modified to focus on the location associated with the notification (e.g., by zooming in on the deck location and/or choosing an optimal camera perspective).

Embodiments of the invention provide a number of advantages. For example, embodiments advantageously provide a user/operator with an intuitive and understandable tool for identifying and correcting errors related to the preparation of components on a deck structure. Humans often have difficulty understanding written instructions, alphanumeric part numbers, virtual representations of physical spaces and grids, and other typical sources of information instructing how to prepare a processing system for executing a process. As a result, human operators often make errors when loading components and otherwise setting up a processing system, and this causes the process to fail or be delayed. Embodiments of the invention overcome this problem by incorporating an imaging system, taking images of the deck at different times, and analyzing the images for disparities. For example, embodiments include taking a real image of a correctly-prepared system, taking another real image at a later time when the system is prepared for a second time, and then finding differences between the images. This provides the human operator with a marked-up photograph that can be quickly and easily reviewed and understood, and thereby enables the operator to correct and differences with a high rate of success. Since any errors can be corrected before the process begins, the process can be completed with a high rate of success and a low rate of failure and delays.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety.

What is claimed is:

1. A method comprising:
   a) causing an imaging device to capture a single second image of an entire deck of structure, the deck comprising a plurality of discrete deck locations, a plurality of different labware components respectively in the discrete deck locations;
   b) comparing, by a processor in communication with the imaging device, the entire second image to a first image stored in a memory in a computer apparatus;
   c) determining, by the processor, if there are any differences between the second image and the first image; and
   d) outputting, by an output device in communication with the processor, an indication of any differences between the second image and the first image that may cause disruption or failure of a process run on an apparatus for processing biological samples.

2. The method of claim 1, wherein the plurality of different components is a second plurality of different components, and the first image comprises a first plurality of different components.

3. The method of claim 2, wherein the indication of any differences includes at least one deck location having different components in the second and first images.

4. The method of claim 1, wherein determining if there are any differences between the second image and the first image includes determining a first difference between the second image and the first image, the first difference being associated with a first discrete deck location from the plurality of discrete deck locations, and wherein the indication of any differences includes a representation of the second image having a highlighted area, the highlighted area associated with the first discrete deck location associated with the first difference between the second image and the first image.

5. The method of claim 1, wherein the indication indicates that there no differences between the second image and the first image that may cause disruption or failure of the process run on the apparatus.

6. The method of claim 1, wherein apparatus is programmed to allow a user to configure types of components that are to be located in the plurality of discrete deck locations so that different processes can be run on the apparatus.

7. The method of claim 1, wherein the imaging device comprises a camera.

8. The method of claim 1, wherein the plurality of different components is a second plurality of different components, and the first image comprises a first plurality of different components, wherein the first image was formed by:
   before capturing the second image, capturing the first image by the imaging device, the deck comprising the plurality of discrete deck locations, the first plurality of different components respectively in the discrete deck locations.

9. The method of claim 8, further comprising:
   before capturing the first image, receiving, by the apparatus, a protocol to perform the process;
   after capturing the first image, performing, by the apparatus, the process; and
   after performing the process storing the first image in the memory.

10. The method of claim 1, further comprising mapping one of the plurality of discrete deck locations to a pixel range in the second image.

11. A system comprising:
    an apparatus for performing a process; and
    an imaging device;
    a computer apparatus comprising a processor, an output device coupled to the processor, and a non-transitory computer readable medium coupled to the processor, the computer apparatus operatively coupled to the imaging device and the apparatus, the non-transitory computer readable medium comprising code, executable by the processor, to perform a method comprising:
    a) causing the imaging device to capture a single second image of an entire deck of a structure, the deck comprising a plurality of discrete deck locations, a plurality of different components respectively in the discrete deck locations, wherein the components comprise labware, wherein the apparatus is for processing biological samples, and wherein the imaging device comprises a camera;

b) comparing, by the processor, the entire second image to a first image stored in a memory in the computer apparatus;

c) determining, by the processor, if there are any differences between the second image and the first image; and d) causing the output device to produce an indication of any differences between the second image and the first image that may cause disruption or failure of the process performed by the apparatus.

12. The system of claim 11, wherein the plurality of different components is a second plurality of different components, and the first image comprises a first plurality of different components.

13. The system of claim 12, further comprising:
the deck of the structure, the deck comprising the plurality of discrete deck locations, wherein the indication of any differences includes at least one deck location having different components in the second and first images.

14. The system of claim 11, wherein determining if there are any differences between the second image and the first image includes determining a first difference between the second image and the first image, the first difference being associated with a first discrete deck location from the plurality of discrete deck locations, and wherein the indication of any differences includes a representation of the second image having a highlighted area, the highlighted area associated with the first discrete deck location associated with the first difference between the second image and the first image.

15. The system of claim 11, wherein the indication indicates that there no differences between the second image and the first image that may cause disruption or failure of the process run on the apparatus.

16. The system of claim 11, wherein apparatus is programmed to allow a user to configure types of components that are to be located in the plurality of discrete deck locations so that different processes can be run on the apparatus.

17. The system of claim 11, wherein the plurality of different components is a second plurality of different components, and the first image comprises a first plurality of different components, wherein the first image was formed by:
before capturing the second image, capturing the first image, by the imaging device, the deck comprising the plurality of discrete deck locations, the first plurality of different components respectively in the discrete deck locations.

18. The system of claim 17, wherein the method further comprises:
before capturing the first image, receiving, by the apparatus, a protocol to perform the process;
after capturing the first image, performing, by the apparatus, the process; and
after performing the process storing the first image in the memory.

* * * * *